United States Patent
Anderson et al.

(10) Patent No.: US 10,454,938 B2
(45) Date of Patent: Oct. 22, 2019

(54) DYNAMIC PERMISSION ROLES FOR CLOUD BASED APPLICATIONS

(71) Applicant: International Business Machines Corporation, Armonk, NY (US)

(72) Inventors: Sheehan Anderson, Morrisville, NC (US); Richard L. Kulp, Cary, NC (US); Gili Mendel, Cary, NC (US); Jianjun Zhang, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 303 days.

(21) Appl. No.: 14/723,516

(22) Filed: May 28, 2015

(65) Prior Publication Data

US 2016/0352746 A1 Dec. 1, 2016

(51) Int. Cl.
*H04L 29/06* (2006.01)
*G06F 8/70* (2018.01)
(Continued)

(52) U.S. Cl.
CPC .............. *H04L 63/102* (2013.01); *G06F 8/70* (2013.01); *G06F 21/30* (2013.01);
(Continued)

(58) Field of Classification Search
CPC ..... H04L 63/102; H04L 63/08; H04L 63/108; H04L 63/104; G06F 8/70; G06F 8/20;
(Continued)

(56) References Cited

U.S. PATENT DOCUMENTS 5,432,934 A * 7/1995 Levin ............... G06F 21/83
 726/16
5,550,968 A * 8/1996 Miller ............... G06F 3/0481
 715/741
(Continued)

OTHER PUBLICATIONS

Muthurajkunnar—"Intelligent Temporal Role Based Access Control for Data Storage in Cloud Database," 2014 Sixth International Conference on Advanced Computing, pp. 184-188 (Year: 2014).*

(Continued)

*Primary Examiner* — Luu T Pham
*Assistant Examiner* — James J Wilcox
(74) *Attorney, Agent, or Firm* — Cuenot, Forsythe & Kim, LLC

(57) ABSTRACT

During development of an application, an association between a view of the application and a data service, and rules applicable to the view, can be received. The rules can include an indication of a security role assigned to users who are allowed to access the view and an indication of whether the view is allowed to access the data service based on the security role assigned to the user. Based on the rules applicable to the view, permissions for accessing the data service by the view can be automatically extrapolated. Based on the permissions extrapolated for accessing the data service by the view, a binding credential, configured to be processed to determine whether the view of the application is granted access to data provided by the data service at runtime, can be automatically created. The at least one binding credential can be assigned to the view of the application.

14 Claims, 6 Drawing Sheets

(51) Int. Cl.
*G06F 21/30* (2013.01)
*G06F 21/62* (2013.01)

(52) U.S. Cl.
CPC .......... *G06F 21/6218* (2013.01); *H04L 63/08* (2013.01); *H04L 63/104* (2013.01); *G06F 2221/2141* (2013.01)

(58) Field of Classification Search
CPC ................. G06F 21/30; G06F 21/6218; G06F 2221/2141
See application file for complete search history.

(56) References Cited

U.S. PATENT DOCUMENTS

| | | | | |
|---|---|---|---|---|
| 6,202,066 | B1* | 3/2001 | Barkley | G06F 21/6218 707/785 |
| 6,473,748 | B1* | 10/2002 | Archer | G06Q 10/10 706/45 |
| 6,934,706 | B1* | 8/2005 | Mancuso | G06F 17/30893 |
| 7,735,122 | B1* | 6/2010 | Johnson | G06Q 20/383 705/74 |
| 8,365,254 | B2* | 1/2013 | Burke | G06F 21/604 726/21 |
| 8,745,387 | B2* | 6/2014 | Choudhary | G06F 21/6227 713/165 |
| 8,869,052 | B2 | 10/2014 | Dattke | |
| 2004/0139092 | A1* | 7/2004 | Jones, Jr. | G06F 19/324 |
| 2006/0095276 | A1* | 5/2006 | Axelrod | G06Q 99/00 717/104 |
| 2006/0136479 | A1* | 6/2006 | Fan | G06F 21/6227 |
| 2011/0047611 | A1* | 2/2011 | Hayler | G06F 12/1466 726/12 |
| 2011/0083167 | A1* | 4/2011 | Carpenter | H04L 67/10 726/4 |
| 2011/0265188 | A1* | 10/2011 | Ramaswamy | G06F 9/4443 726/28 |
| 2012/0136936 | A1* | 5/2012 | Quintuna | G06F 21/604 709/204 |
| 2012/0137213 | A1* | 5/2012 | Hayler | G06F 12/1466 715/239 |
| 2012/0151568 | A1* | 6/2012 | Pieczul | H04L 63/0815 726/8 |
| 2014/0040800 | A1* | 2/2014 | Fredette | G06F 8/34 715/765 |
| 2015/0019590 | A1 | 1/2015 | Brooks et al. | |
| 2015/0089385 | A1* | 3/2015 | Radhakrishnan | H04L 41/22 715/745 |
| 2016/0164873 | A1* | 6/2016 | Das | H04L 63/10 707/784 |

OTHER PUBLICATIONS

Bleizeffer—"Description and Application of Core Cloud User Roles," IBM Corporation, ACM CHIMIT'11, Dec. 4, 2011, pp. 1-9 (Year: 2011).*

"NIST Cloud Computing Program," [online] National Institute of Standards and Technology, U.S. Dept. of Commerce, Apr. 29, 2015, [retrieved May 27, 2015] retrieved from the Internet: <http://www.nist.gov/itl/cloud/>, 3 pg.

Mell, P. et al., "The NIST Definition of Cloud Computing," National Institute of Standards and Technology, U.S. Dept. of Commerce, Special Publication 800-145, Sep. 2011, [retrieved May 27, 2015] retrieved from the Internet: <http://csrc.nist.gov/publications/nistpubs/800-145/SP800-145.pdf>, 7 pg.

* cited by examiner

DYNAMIC PERMISSION ROLES FOR CLOUD BASED APPLICATIONS

BACKGROUND

The present invention relates to computer security, and more specifically, to permissions required to access a data service.

As the development of cloud-based applications continues to proliferate, so too does the concern over secure access to data. Indeed, data security is a high priority for those developing cloud-based applications. There are, however, a number of myths concerning data security that too often are believed by application developers. One myth, for example, is that hackers cause most security breaches. In reality, 80% of data loss is caused by insiders. Another myth is that encryption, in and of itself, is a solution to securing data. Strong security measures, however, also require access control, data integrity, system availability and auditing. Another myth is that firewalls make data secure, although large percentage of Internet break-ins occur in spite of a firewall being in place. Moreover, the use of firewalls adds a level of complexity that is not always convenient for certain types of application deployment scenarios, for example when an application is being made available for use to large numbers of users.

SUMMARY

A method includes receiving, during development of an application, an association between at least one view of the application and at least one data service. The method also includes receiving rules applicable to the at least one view of the application. The rules can include an indication of a security role assigned to at least one user who is allowed to access the view of the application and an indication of whether the view is allowed to access the data service based on the security role assigned to the at least one user. The method also includes, based on the rules applicable to the at least one view, automatically extrapolating permissions for accessing the data service by the at least one view. The method also includes, based on the permissions extrapolated for accessing the data service by the at least one view, automatically creating, using a processor, at least one binding credential configured to be processed to determine whether the view of the application is granted access to data provided by the data service at runtime. The method also includes assigning the at least one binding credential to the view of the application.

A system includes a processor programmed to initiate executable operations. The executable operations include receiving, during development of an application, an association between at least one view of the application and at least one data service. The executable operations also include receiving rules applicable to the at least one view of the application. The rules can include an indication of a security role assigned to at least one user who is allowed to access the view of the application and an indication of whether the view is allowed to access the data service based on the security role assigned to the at least one user. The executable operations also include, based on the rules applicable to the at least one view, automatically extrapolating permissions for accessing the data service by the at least one view. The executable operations also include, based on the permissions extrapolated for accessing the data service by the at least one view, automatically creating at least one binding credential configured to be processed to determine whether the view of the application is granted access to data provided by the data service at runtime. The executable operations also include assigning the at least one binding credential to the view of the application.

A computer program includes a computer readable storage medium having program code stored thereon. The program code is executable by a processor to perform a method. The method includes receiving, by the processor, during development of an application, an association between at least one view of the application and at least one data service. The method also includes receiving, by the processor, rules applicable to the at least one view of the application. The rules can include an indication of a security role assigned to at least one user who is allowed to access the view of the application and an indication of whether the view is allowed to access the data service based on the security role assigned to the at least one user. The method also includes, based on the rules applicable to the at least one view, automatically extrapolating, by the processor, permissions for accessing the data service by the at least one view. The method also includes, based on the permissions extrapolated for accessing the data service by the at least one view, automatically creating, by the processor, at least one binding credential configured to be processed to determine whether the view of the application is granted access to data provided by the data service at runtime. The method also includes assigning, by the processor, the at least one binding credential to the view of the application.

DETAILED DESCRIPTION

Figure 1:
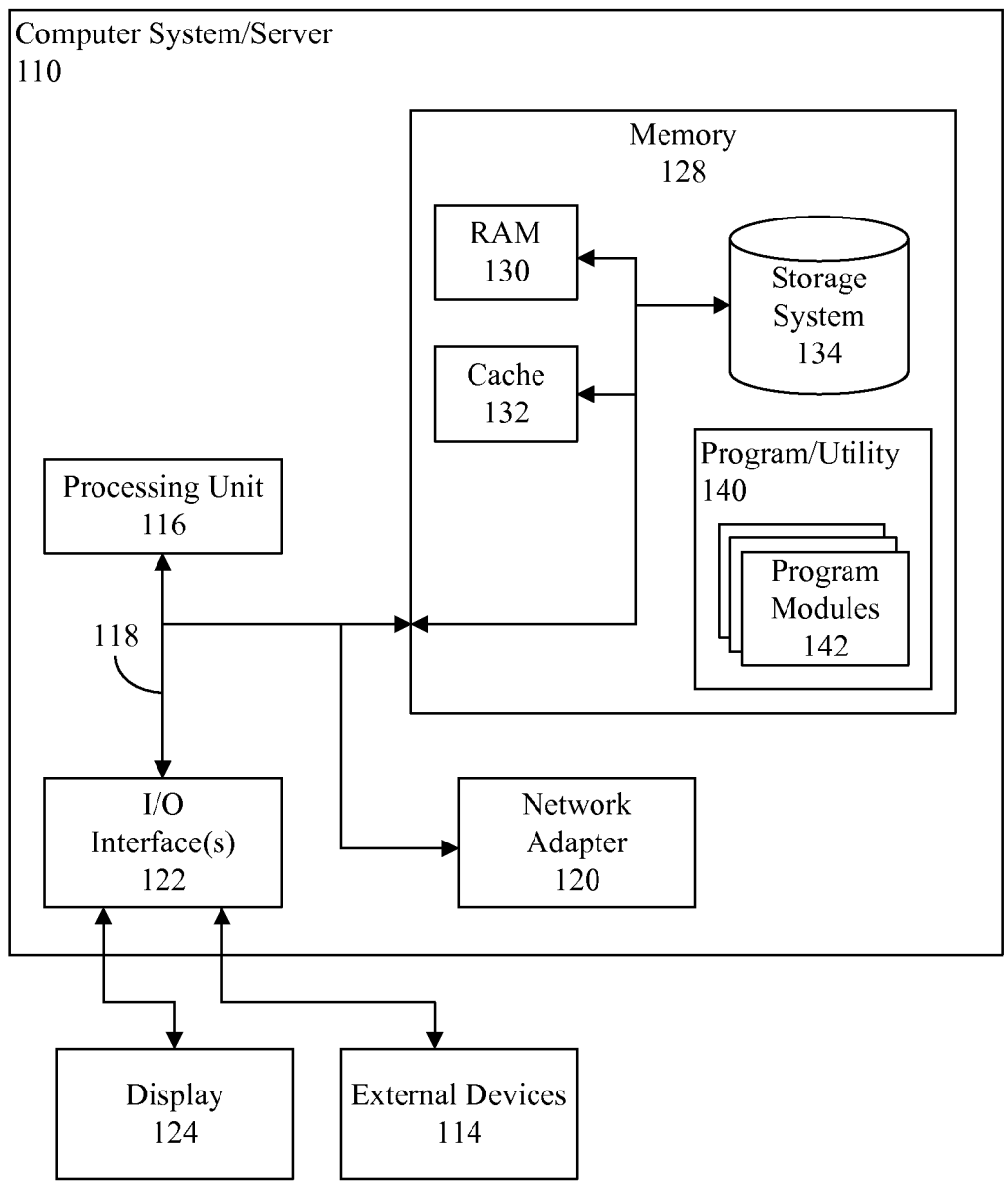
FIG. 1 is a block diagram illustrating a computer system/server of a cloud computing node in accordance with one embodiment of the present invention.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to computer security, and more specifically, to permissions required to access a data service that provides data to an application. In accordance with the arrangements described herein, rather than assigning data access permissions to users, permissions to access data services can be assigned to views of an application. Accordingly, an application developer need only be concerned with security roles assigned to users who are given access to the various views of the application, and need not be concerned with assigning security roles for accessing the data services. Instead, one or more binding credentials between each view of the application and the data services can be automatically created based on security roles assigned for user access to the views and indications of whether the views are allowed to access the data services. In one aspect, the indications of whether the views are allowed to access the data services can indicate whether the views have read-only or read/write access to the data services. Thus, the present arrangements greatly simplify the task of implementing computer security for data access.

Several definitions that apply throughout this document now will be presented.

As defined herein, the term "cloud based application" means an application that is configured to be executed in a cloud computing environment.

As defined herein, the term "view" means a graphical control element, presented on a display of a processing device, containing graphical user interface elements of an application. Examples of a view include, but are not limited to, a window and a pane.

As defined herein, the term "data service" means service that provides data to an application. Examples of a data service include, but are not limited to, a data table, a triple store, a database, and the like.

As defined herein, the term "security role" means a role assigned to one or more users of an application that is used to determine whether the one or more users may access one or more views of the application.

As defined herein, the term "binding credential" means data that associates a view of an application with data service and specifies a level of access, by the view, of data provided by the data service. For example, a "binding credential" can indicate that the view is or is not provided access to the data. If the "binding credential" indicates that the view is provided access to the data, the "binding credential" can indicate whether the view is provided read only access or read/write access to the data. Read/write access can include access to not only read data, but also to create data, edit data and/or delete data.

As defined herein, the term "runtime" means while an application is executed during a user session.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "output" means storing in memory elements, sending or transmitting to another system, exporting, or the like.

As defined herein, the term "automatically" means without user intervention.

As defined herein, the term "developer" means a person (i.e., a human being) who develops at least one component of an application.

As defined herein, the term "user" means a person (i.e., a human being) who uses an application.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer (or end user) does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. The cloud computing node 100 is only one example of a suitable cloud computing node and is not intended to suggest any limitation as to the scope of use or functionality of embodiments of the invention described herein. Regardless, the cloud computing node 100 is capable of being implemented and/or performing any of the functionality set forth hereinabove.

The cloud computing node 100 can include a processing system/server 110, which is operational with numerous other general purpose or special purpose computing system environments or configurations. Examples of well-known computing systems, environments, and/or configurations that may be suitable for use with processing system/server 110 include, but are not limited to, personal computer systems, server computer systems, control nodes, storage area network (SAN) controllers, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The processing system/server 110 may be described in the general context of computer system executable instructions, such as program modules, being executed by a computer system or other processing system. Generally, program modules may include routines, programs, objects, components, logic, data structures, and so on that perform particular tasks or implement particular abstract data types. The processing system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the processing system/server 110 in the cloud computing node 100 is shown in the form of a general-purpose computing device. The components of the processing system/server 110 may include, but are not limited to, one or more processors or processing units 116, a system memory 128, and a bus 118 that couples various system components including system memory 128 to the processor 116.

The bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The processing system/server 110 typically may include a variety of computer-readable storage media. Such media may be any available media that is accessible by the processing system/server 110, and it includes both volatile and non-volatile media, removable and non-removable media. System memory 128 can include computer-readable storage media in the form of volatile memory, such as random access memory (RAM) 130 and/or cache memory 132. The processing system/server 110 may further include other removable/non-removable, volatile/non-volatile computer-readable storage media. By way of example only, a storage system 134 can be provided for reading from and writing to at least one non-volatile computer-readable storage media. Examples of computer-readable storage media can include, but are not limited to, a data storage device that comprises non-volatile magnetic media (e.g., a "hard disk drive" or "HDD"), a data storage device that comprises non-volatile solid state media (e.g., a "solid state drive" or "SSD"), a data storage device that comprises non-volatile magneto-optical media, and the like. Although not shown, a magnetic disk drive for reading from and writing to a removable, non-volatile magnetic disk (e.g., a "floppy disk"), an optical disk drive for reading from or writing to a removable, non-volatile optical disk such as a CD-ROM, DVD-ROM or other optical media, a solid state drive for reading from or writing to a removable, non-volatile, solid state drive can be provided. In such instances, each can be connected to the bus 118 by one or more data media interfaces, such as a fiber channel interface, a serial advanced technology attachment (SATA) interface, fiber channel interface, a small computer system interface (SCSI) interface, a serial attached SCSI (SAS) interface, or the like.

The memory 128 may include at least one computer program product that includes a computer-readable storage medium having computer-readable program code embodied therewith. The "computer-readable storage medium" can be non-transitory in nature. The computer-readable program code can include a set (e.g., at least one) of program modules 142 that are configured to carry out the functions of embodiments of the invention. The program/utility 140, having a set (at least one) of program modules 142, may be stored in the memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention as described herein.

The processing system/server 110 may also communicate with one or more external devices 114 such as a keyboard, a pointing device, a display 124, etc.; one or more devices that enable a user to interact with processing system/server 110; and/or any devices (e.g., network card, modem, etc.) that enable processing system/server 110 to communicate with one or more other computing devices. Such communication can occur via Input/Output (I/O) interfaces 122. Still yet, the processing system/server 110 can communicate with one or more networks such as a local area network (LAN), a general wide area network (WAN), and/or a public network (e.g., the Internet) via network adapter 120. As depicted, the network adapter 120 can communicate with the other components of the processing system/server 110 via the bus 118. It should be understood that although not shown, other hardware and/or software components could be used in conjunction with the processing system/server 110. Examples, include, but are not limited to: microcode, device drivers, redundant processing units, external disk drive arrays, RAID systems, tape drives, and data archival storage systems, etc.

Figure 2:
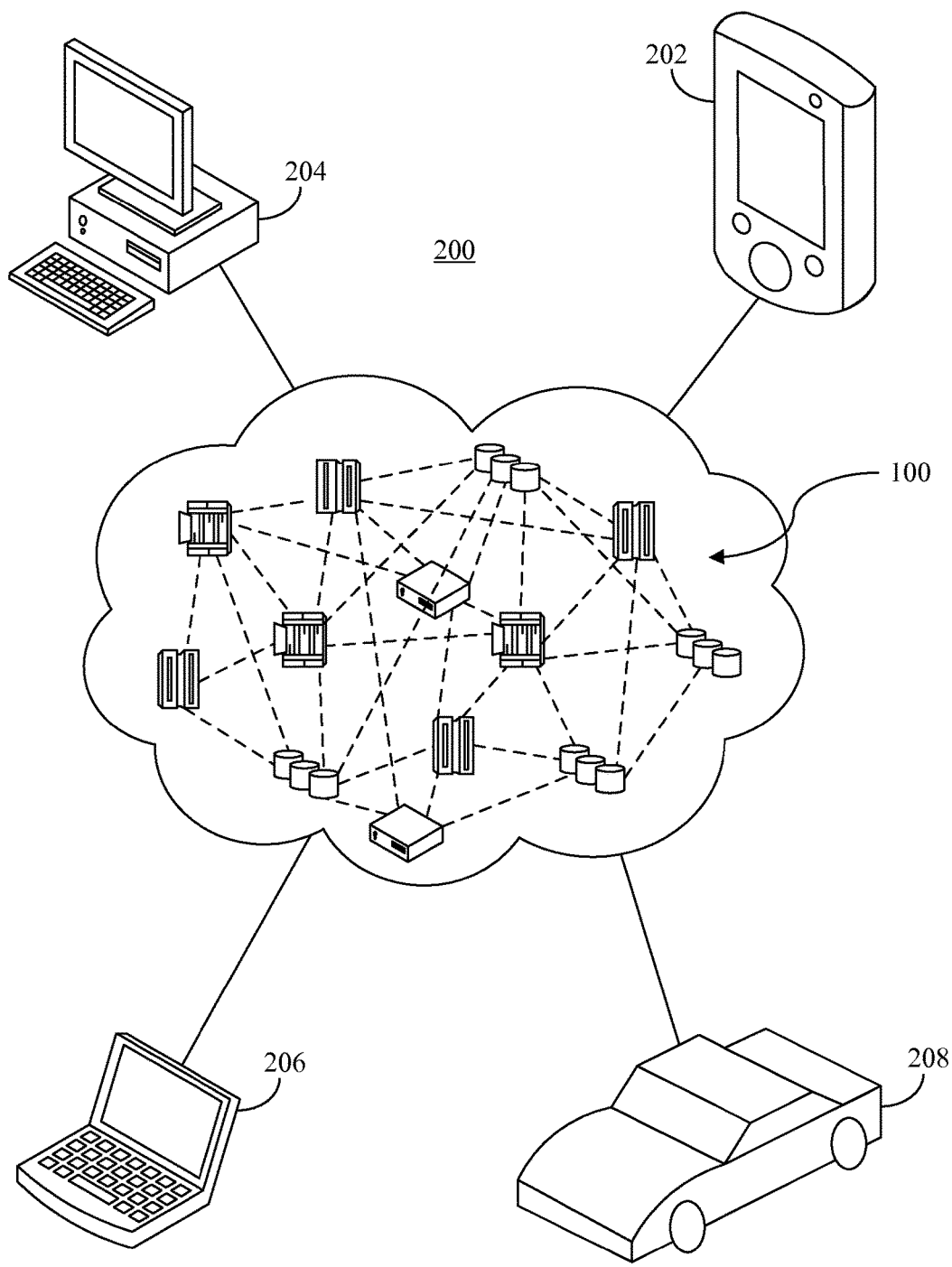
FIG. 2 depicts a cloud computing environment in accordance with one embodiment of the present invention.

Referring now to FIG. 2, an illustrative cloud computing environment 200 is depicted. As shown, the cloud computing environment 200 comprises one or more cloud computing nodes 100 with which local computing devices used by cloud consumers (e.g., client devices), such as, for example, a personal digital assistant (PDA) or smart phone (e.g., cellular telephone) 202, a desktop computer (or workstation) 204, a laptop computer 206, and/or an automobile computer system 208 may communicate. The computing nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 202-208 shown in FIG. 2 are intended to be illustrative only and that the computing nodes 100 and cloud computing environment 200 can communicate with any type of computerized device over any type of network and/or network addressable connection (e.g., using a web browser).

Figure 3:
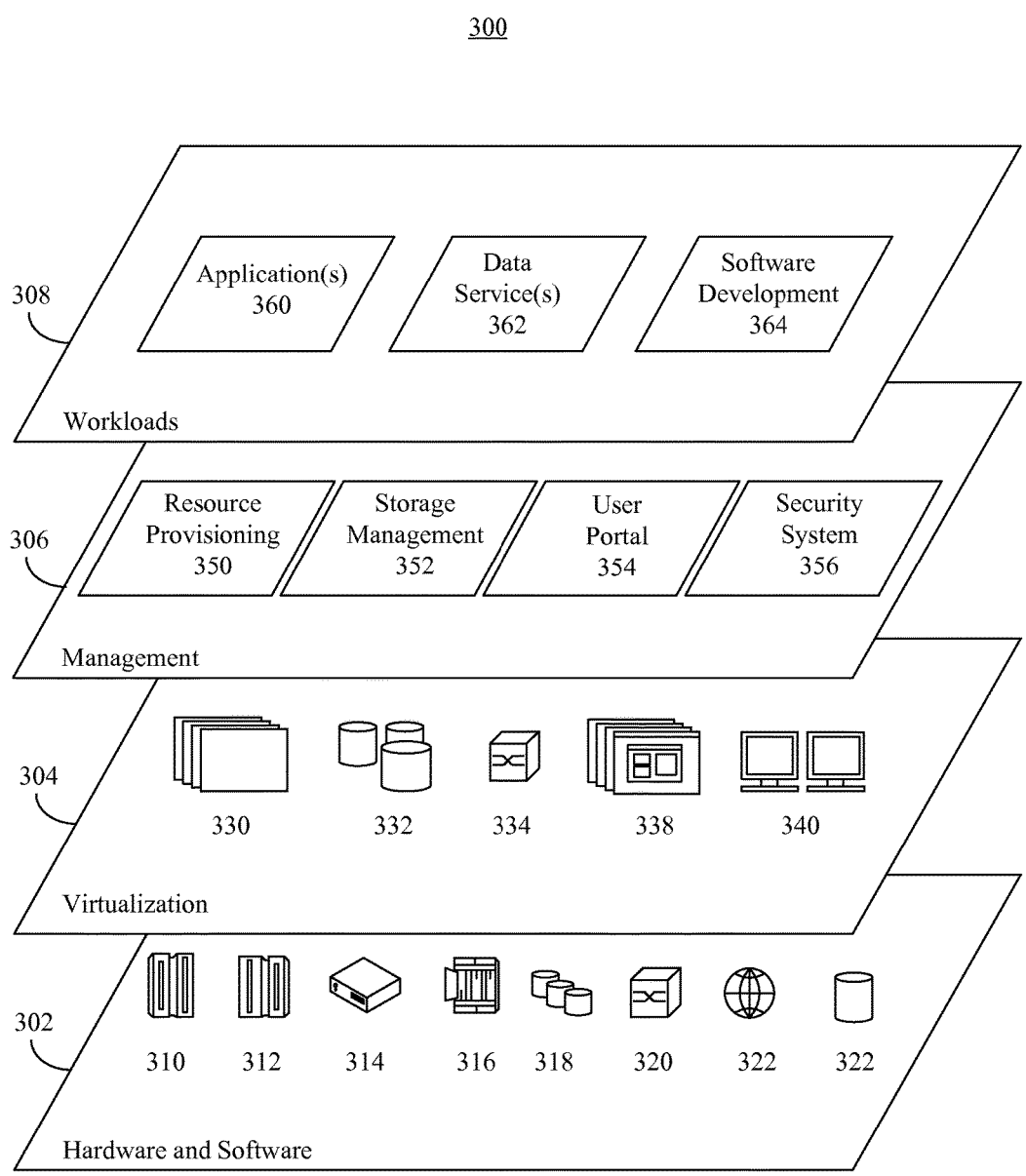
FIG. 3 depicts functional abstraction layers provided by cloud computing environment in accordance with one embodiment of the present invention.

Referring now to FIG. 3, a set of functional abstraction layers 300 provided by cloud computing environment 200 (FIG. 2) is shown. It should be understood in advance that the components, layers, and functions shown in FIG. 3 are intended to be illustrative only and embodiments of the invention are not limited thereto. As depicted, the following layers and corresponding functions are provided:

A hardware and software layer 302 can include hardware and software components. Examples of hardware components include: mainframes 210; RISC (Reduced Instruction Set Computer) architecture based servers 312; servers 314; blade servers 316; storage devices 318; and networks and networking components 320. In some embodiments, software components of the hardware and software layer 302 include network application server software 322 and database software 324.

A virtualization layer 304 can provide an abstraction layer from which the following examples of virtual entities may be provided: virtual servers 330; virtual storage 332; virtual networks 334, including virtual private networks 336; virtual applications and operating systems 338; and virtual clients 340.

In one example, a management layer 306 may provide the functions described below. Resource provisioning 350 provides dynamic procurement of computing resources and other resources that are utilized to perform tasks within the cloud computing environment. Storage management 352 manages the virtual storage within the cloud computing environment. A user portal 354 provides access to the cloud computing environment for consumers and system administrators. A security system 356 implements security features controlling access to applications, data services, and the like. The management layer 306 also can provide service level management (not shown) that provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

A workloads layer 308 can provide workloads for which the cloud computing environment may be utilized. Examples of workloads which may be provided from this layer may include applications 360, data services 362, and software development and lifecycle management tools (e.g., software development and lifecycle management applications) 364. Other workloads, not shown, may include, but are not limited to, mapping and navigation, virtual classroom education delivery, data analytics processing and transaction processing. Still, the workloads layer 308 can include any other applications and/or workloads suitable to be deployed in a cloud computing environment, and the invention is not limited in this regard.

In operation, a developer can interact with software development tools 364 during development of an application 360 being configured to access one or more data services 362. The application 360 can be a cloud based application, though this need not be the case. The software development tools 364 can provide a user interface to specify various security roles, views, rules and users of the application 360.

Figure 4:
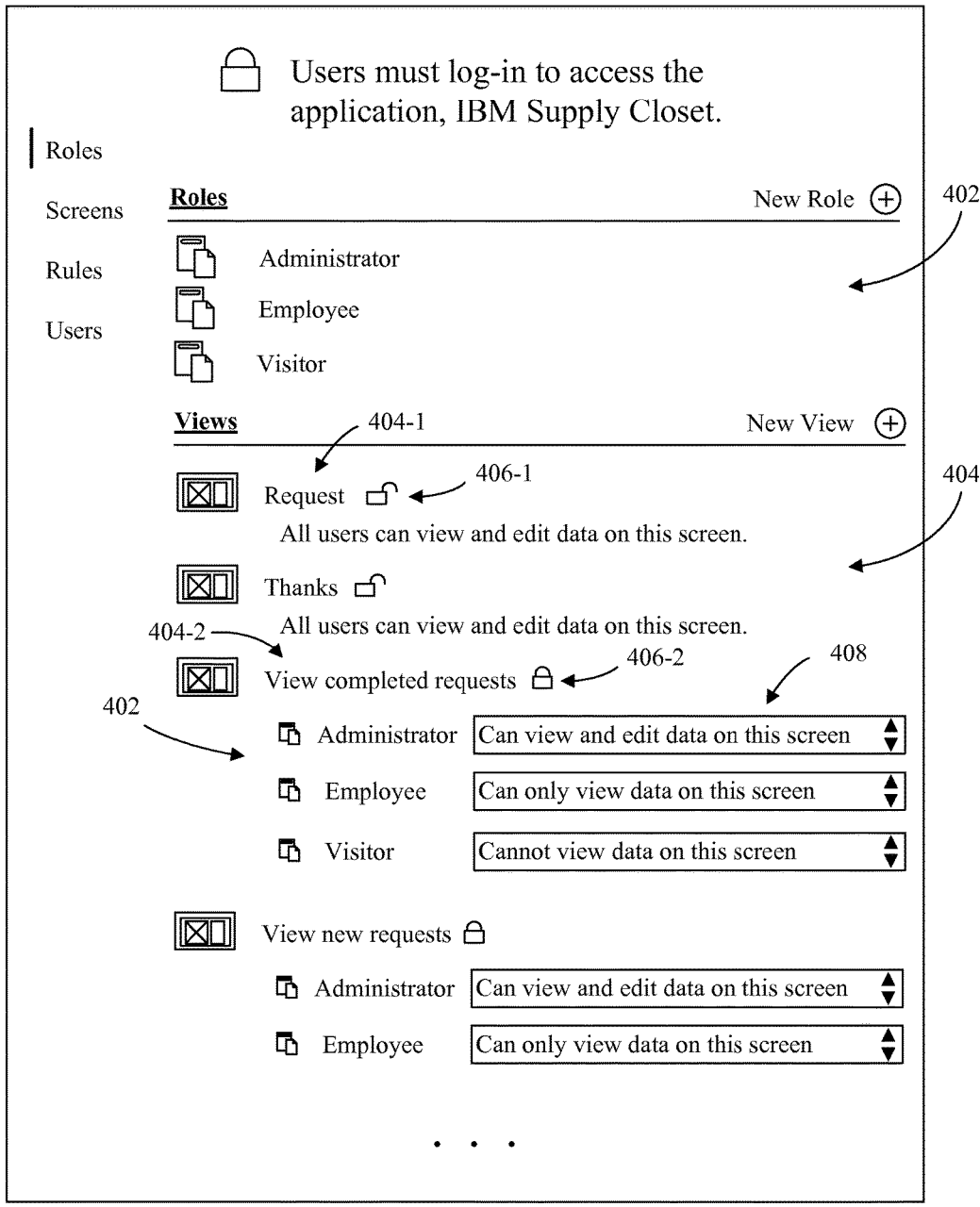
FIG. 4 depicts an example of a view presented by a software development tool.

FIG. 4 depicts an example of a view 400 presented by the software development tool 364. An application developer can interact with user interface elements presented in the view 400 to specify various users of the application 360, security roles, views and applicable rules. In illustration, the view 400 can present user interface elements (not shown) via which the developer can define various users, and user interface elements via which the developer can define security roles 402 for the application 360 (e.g., an administrator role, an employee role, a visitor role, etc.).

The view 400 also can present user interface elements via which the developer can define various views 404 developed for the application 360 and an indication of security roles 402 assigned to users who are allowed to access each view 404. In illustration, a plurality of views 404 may be created for the application 360. By default, each view 404 can be provided read/write access to the data for which the view 404 is configured to access (i.e., data access is unlocked). In contrast, by default, each user can be assigned to have no access to the data. Accordingly, access to the data can be made to be exclusively dependent on the view 400 that is presented to the user, not the user's permissions.

For each view 404 of the application 360, the view 400 of the software development tool 364 can present a user interface element 406 (e.g., a toggle button, icon or the like) selectable by the developer to indicate whether the view is to remain unlocked or is to be locked. If the user interface element 406-1 for a particular view 404-1 remains unlocked, that view can be provided read/write access to corresponding data provided by the data services 362, regardless of the security role assigned to users who are presented the view 404-1.

If, however, the developer selects the user interface element 406-2 to lock the data access for a particular view 404-2, data access by the view 404-2 is determined by the security roles 402 assigned to the view 404-2. In illustration, the view 400 can present the security roles 402 in a manner that allows the user to define data access for the view 404-2 for each of the security roles 402. For example, if the defined security roles 402 include "Administrator," "Employee," and "Visitor," those security roles 402 can be presented proximate to the view 404-2 in the view 400. Further, a menu field 408 can be presented next to each security role 402. From the menu field 408, the developer can select a data access rule to be applied to the view 404-2 for each of the defined security roles. For example, the user can select "Can view and edit data on this screen" for users who are an "Administrator," select "Can only view data on this screen for users who are an "Employee," and select "Cannot view data on this screen" for users who are a visitor.

Accordingly, via the view 400 of the software development tool 364, the developer can provide rules applicable to each of the views 404 of the application 360. Such rules can include an indication of a security role 402 assigned to users who are allowed to access the views 404 of the application 360 and an indication of whether each view 404 is allowed to access the data service(s) 362 based on the security role 402 assigned to the users accessing the views 404. The rules can be output to one or more storage device 318 and/or virtual storage 332. For example, the rules can be stored in the security system 356.

Based on the rules defined by the developer that are applicable to each view 404, permissions for accessing the data service(s) 362 by the views 404 can be automatically extrapolated by the software development tool 364. Further, the software development tool 364 can create one or more binding credentials for each of the views 404, and assign the binding credential(s) to the respective view 404. Each binding credential can specify a mapping of permissions of users, based on their assigned security roles 402, to access a corresponding view 404 and a mapping of permissions of the view to access the data provided by the data service(s) 362. The binding credentials and their assignment can be output to one or more storage device 318 and/or virtual storage 332. For example, the binding credentials can be stored in the security system 356. The binding credentials can be configured to be processed to determine whether the views of the application 360 are granted access to data provided by the data service(s) 362 at runtime.

In illustration, a binding credential can be created for, and assigned to, the view 404-1. That binding credential can be processed to determine that all users authorized to access the view 404-1 have read/write access to data provided by the data service(s) 362 accessed by that view 404-1. Because multiple different security roles 402 are defined to have different data access privileges for the view 404-2, a plurality of binding credentials can be created for, and assigned to, the view 404-2. For example, a first binding credential can be created for the security role "Administrator," a second binding credential can be created for the security role "Employee," and a third binding credential can be created for the security role "Visitor."

Once the application 360 is deployed for use by users, for example as a cloud based application hosted in a cloud computing environment, users can enter authentication credentials (e.g., user name, password, passcode and/or the like) to access the application 360. The authentication credentials can be authenticated to determine whether to allow the user to access the application 360. Assuming the user's authentication credentials are authenticated, responsive to detecting the user attempting to access a view 404 provided by the application 360 (e.g., via a user input), the security role assigned to the user can be accessed, for example from the application 360 or from the security system 356. Based on the security role assigned to the user, the application 360 can determine whether the user is allowed to access the requested view 404 of the application 360.

Responsive to determining that the user is allowed to access the requested view 404, the application 360 can present the view 404 to the user. The application 360 also can access, in real time, from the storage device(s) 318 and/or virtual storage 332 (e.g., from the security system 356), the binding credential assigned to that view 404 for the user's security role 402 to determine whether the view 404 is granted access to the data provided by the data service(s) 362 at runtime. Moreover, if the user is granted access to the data, based on the binding credential, the application 360 can determine whether read-only or read/write access is to be provided to the view 404 presented to the user.

Responsive to determining that the binding credential assigned to that view 404 for the user's security role 402 indicates that the view 404 is not granted access to the data provided by the data service(s) 362, the application 360 need not access such data, and thus the data need not be presented in the view 404. Responsive to determining that the binding credential assigned to that view 404 for the user's security role 402 indicates that the view 404 is granted access to the data provided by the data service(s) 362, the application 360 can, in real time, access such data, and thus present the data in the view 404. Moreover, based on that binding credential, the application 360 can provide to the view 404 read-only or read/write access to the data. Accordingly, via the view, the user can read the data and, if authorized by the binding credential, modify the data (e.g., create data, edit data and/or delete data).

The application 360 can access the data service(s) 362 using at least one representational state transfer (REST) call to the data service(s) 362. For example, the application 360 can be configured to generate at least one REST call responsive to the user being successfully validated to access a view 404. In one example, the rest call can comprise at least one uniform resource identifier (URI), such as a uniform resource locator (URL), that identifies the data service(s) 362, though the present arrangements are not limited in this regard.

In accordance with the arrangements described herein, the application 360 can function as a proxy for access for data provided by the data service(s) 362. Rather than the data service(s) 362 determining whether the user may access the data, the application 360 can receive the binding credentials and selectively grant access to the data provided by the data service(s) 362 based on the binding credentials. In one arrangement, the application 360 can include multiple components. For example, the application 360 can include one or more components executed on a user's local computing device 202-208 (e.g., a mobile application component) and one or more components executed elsewhere in the functional abstraction layers 300. A component of the application 360 that provides the proxy services can be resident elsewhere in the functional abstraction layers 300 (i.e., not on the user's local computing device 202-208).

Figure 5:
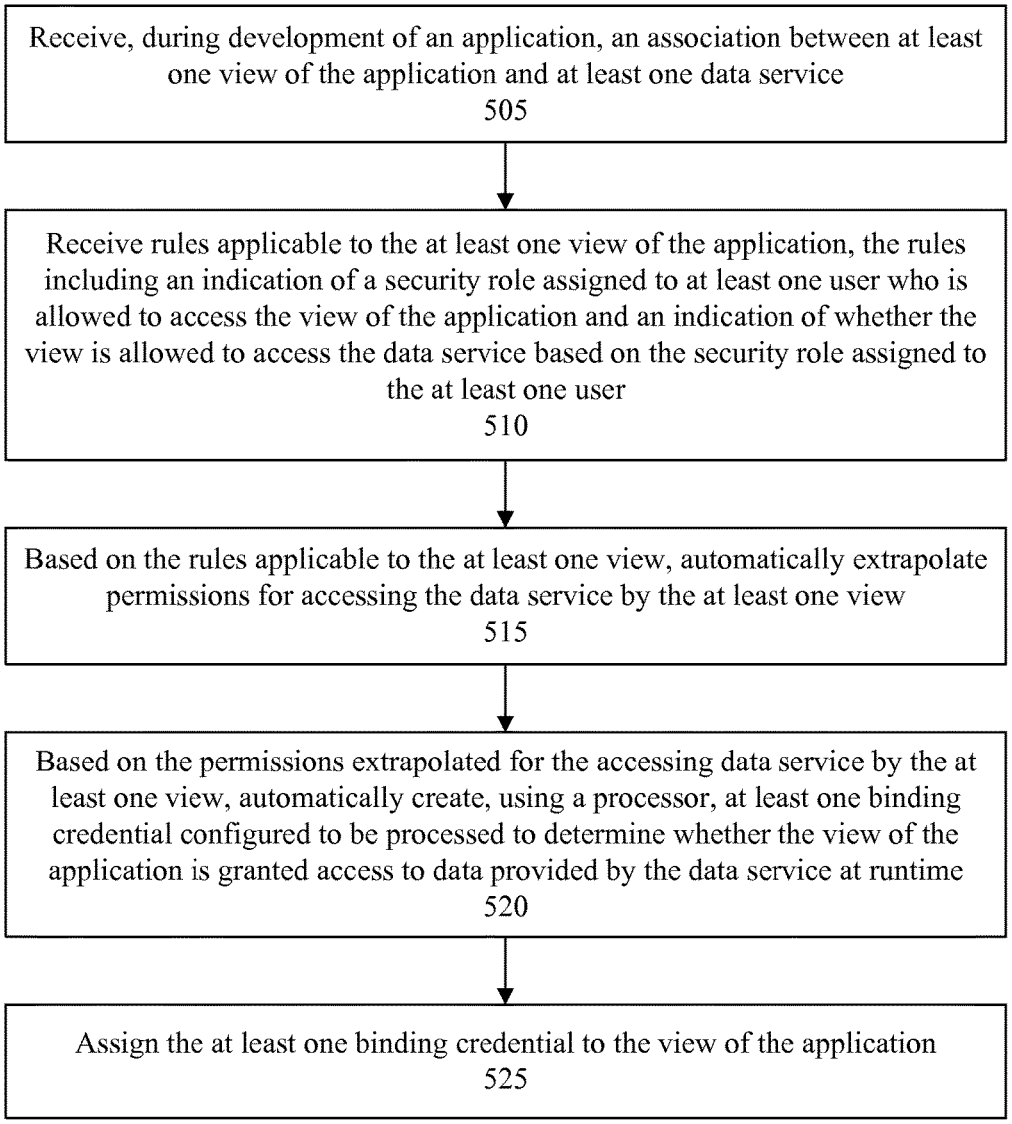
FIG. 5 is a flow chart illustrating an example of a method of creating at least one binding credential configured.

FIG. 5 is a flow chart illustrating an example of a method 500 of creating at least one binding credential configured. At step 505, an association between at least one view of the application and at least one data service can be received during development of an application. At step 510, rules applicable to the at least one view of the application can be received. The rules can include an indication of a security role assigned to at least one user who is allowed to access the view of the application and an indication of whether the view is allowed to access the data service based on the security role assigned to the at least one user. In one aspect, the indication of whether the view is allowed to access the data service can indicate whether the view has read-only or read/write access to the data service.

At step 515, based on the rules applicable to the at least one view, permissions for accessing the data service by the at least one view can be automatically extrapolated. In one aspect, the permissions for accessing the data service by the at least one view further can be based on the indication of whether the view is granted read-only or read/write access to the data service. At step 520, based on the permissions extrapolated for accessing the data service by the at least one view, at least one binding credential can be automatically created using a processor. In one aspect, the at least one binding credential can indicate whether the view has read-only access or read/write access to the data service. The binding credential(s) can be configured to be processed to determine whether the view of the application is granted access to data provided by the data service at runtime. At step 525, the at least one binding credential can be assigned to the view of the application.

Figure 6:
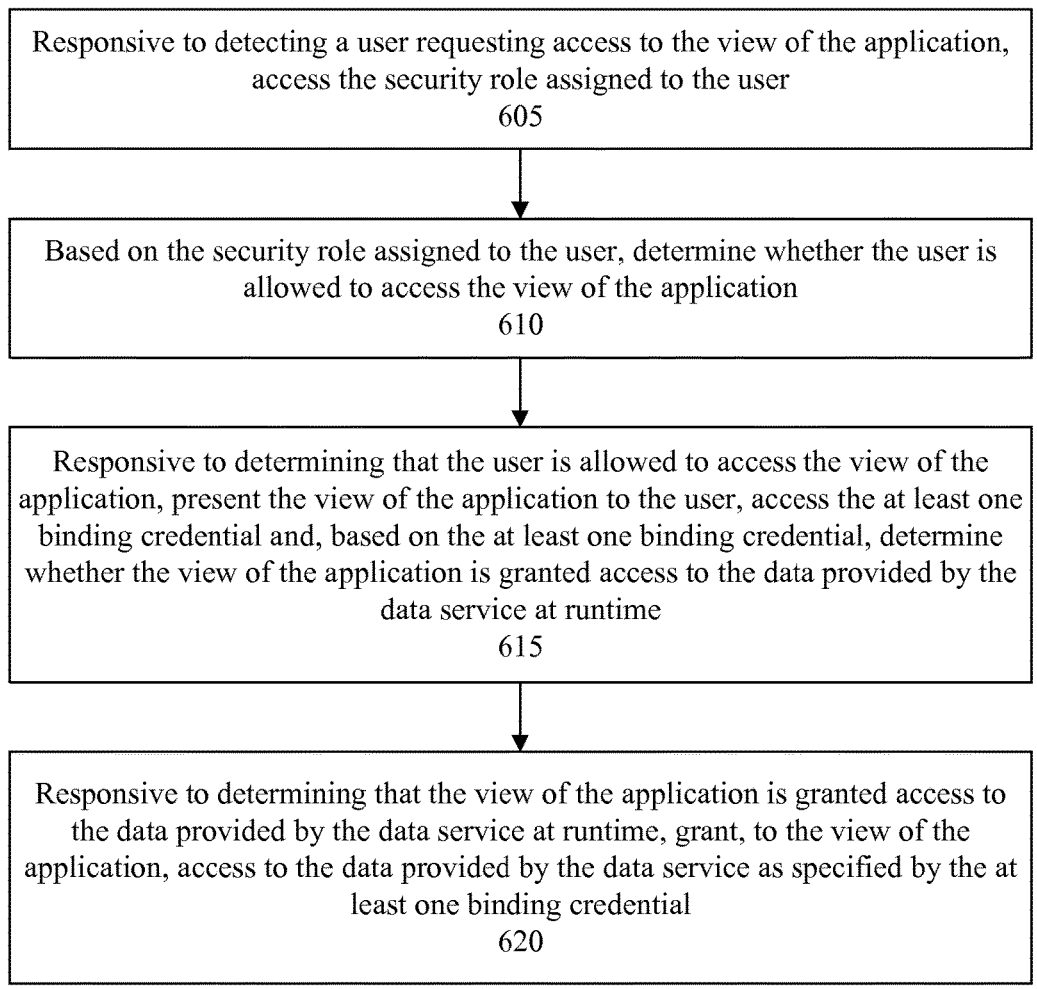
FIG. 6 is a flow chart illustrating an example of a method of using a binding credential to selectively access data provided by a data service.

FIG. 6 is a flow chart illustrating an example of a method 600 of using a binding credential to selectively access data provided by a data service. At step 605, responsive to detecting a user requesting access to the view of the application, the security role assigned to the user can be accessed. At step 610, based on the security role assigned to the user, a determination can be made as to whether the user is allowed to access the view of the application.

At step 615, responsive to determining that the user is allowed to access the view of the application, the view of the application can be presented to the user, the at least one binding credential can be accessed and, based on the at least one binding credential, a determination can be made as to whether the view of the application is granted access to the data provided by the data service at runtime. In one aspect, a further determination can be made as to whether the view of the application is granted read-only or read/write access to the data service at runtime. At step 620, responsive to determining that the view of the application is granted access to the data provided by the data service at runtime, access to the data provided by the data service as specified by the at least one binding credential can be granted to the view of the application. In one aspect, read-only or read/write access to the data provided by the data service, as specified by the at least one binding credential, can be granted.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    receiving, during development of an application, an association between at least one window or pane of the application and at least one data service, wherein the application is provided as a service in a cloud computing environment;
    receiving rules applicable to the at least one window or pane of the application, the rules comprising:
        information indicating a first security role assigned to at least a first user who is allowed to access the window or pane of the application and at least a second security role assigned to at least a second user who is allowed to access the window or pane; and
        information indicating whether the window or pane is allowed to access the data service based on the first security role assigned to at least the first user and indicating whether the window or pane is allowed to access the data service based on the second security role assigned to at least the second user;
    based on the rules applicable to the at least one window or pane, automatically extrapolating, by a software development tool executed by a processor, permissions for accessing the data service by the at least one window or pane;
    based on the permissions extrapolated for accessing the data service by the at least one window or pane, automatically creating, by the software development tool, a first binding credential configured to be processed to determine whether the window or pane of the application is granted access to data provided by the data service at runtime while the window or pane is being accessed by at least the first user assigned the first security role, and automatically creating, by the software development tool, at least a second binding credential configured to be processed to determine whether the window or pane of the application is granted access to the data provided by the data service at runtime while the window or pane is being accessed by at least the second user assigned the second security role, wherein the first binding credential specifies a mapping of permissions of users who are assigned the first security role to access the window or pane and a mapping of permissions of the window or pane to access the data provided by the data service while the window or pane is being accessed by the users who are assigned the first security role, and the second binding credential specifies a mapping of permissions of users who are assigned the second security role to access the window or pane and a mapping of permissions of the window or pane to access the data provided by the data service while the window or pane is being accessed by the users who are assigned the second security role;
    assigning the first binding credential and the second binding credential to the window or pane of the application, wherein the application functions as a proxy for access to the data provided by the data service, the application determines, based on the first binding credential, whether the window or pane is granted access to the data provided by the data service at runtime while the window or pane is being accessed by at least the first user who is assigned the first security role, and the application determines, based on the second binding credential, whether the window or pane is granted access to the data provided by the data service at runtime while the window or pane is being accessed by at least the second user who is assigned the second security role;

responsive to detecting the first user requesting access to the window or pane of the application, accessing the first security role assigned to the first user;

based on the first security role assigned to the first user, determining whether the first user is allowed to access the window or pane of the application;

responsive to determining that the first user is allowed to access the window or pane of the application:
  presenting the window or pane of the application to the first user; and
  based on the first binding credential, determining whether the window or pane of the application is granted access to the data provided by the data service at runtime; and responsive to determining that the window or pane of the application is granted access to the data provided by the data service at runtime for the first user, granting, to the window or pane of the application, access to the data provided by the data service as specified by the first binding credential.

2. The method of claim 1, wherein:
the indication of whether the window or pane is allowed to access the data service indicates whether the window or pane has read-only or read/write access to the data service; and
extrapolating permissions for accessing the data service by the at least one window or pane further is based on the indication of whether the window or pane is granted read-only or read/write access to the data service and the first binding credential indicates whether the window or pane has read-only access or read/write access to the data service.

3. The method of claim 2, wherein the access to the data provided by the data service is read-only access or read/write access to the data service.

4. The method of claim 1, wherein:
the application accesses the data service using at least one representational state transfer (REST) call to the data service; and
the application is configured to generate the at least one REST call responsive to the user being successfully validated to access the window or pane.

5. The method of claim 1, further comprising:
responsive to detecting the second user requesting access to the window or pane of the application, accessing the second security role assigned to the second user;
based on the second security role assigned to the second user, determining whether the second user is allowed to access the window or pane of the application;
responsive to determining that the second user is allowed to access the window or pane of the application:
  presenting the window or pane of the application to the second user; and
  based on the second binding credential, determining whether the window or pane of the application is granted access to the data provided by the data service at runtime; and responsive to determining that the window or pane of the application is not granted access to the data provided by the data service at runtime for the second user, denying, to the window or pane of the application, access to the data provided by the data service as specified by the second binding credential.

6. A system, comprising:
a processor programmed to initiate executable operations comprising:
receiving, during development of an application, an association between at least one window or pane of the application and at least one data service, wherein the application is provided as a service in a cloud computing environment;
receiving rules applicable to the at least one window or pane of the application, the rules comprising:
  information indicating a first security role assigned to at least a first user who is allowed to access the window or pane of the application and at least a second security role assigned to at least a second user who is allowed to access the window or pane; and
  information indicating whether the window or pane is allowed to access the data service based on the first security role assigned to at least the first user and indicating whether the window or pane is allowed to access the data service based on the second security role assigned to at least the second user;
based on the rules applicable to the at least one window or pane, automatically extrapolating, by a software development tool executed by a processor, permissions for accessing the data service by the at least one window or pane;
based on the permissions extrapolated for accessing the data service by the at least one window or pane, automatically creating, by the software development tool, a first binding credential configured to be processed to determine whether the window or pane of the application is granted access to data provided by the data service at runtime while the window or pane is being accessed by at least the first user assigned the first security role, and automatically creating, by the software development tool, at least a second binding credential configured to be processed to determine whether the window or pane of the application is granted access to the data provided by the data service at runtime while the window or pane is being accessed by at least the second user assigned the second security role, wherein the first binding credential specifies a mapping of permissions of users who are assigned the first security role to access the window or pane and a mapping of permissions of the window or pane to access the data provided by the data service while the window or pane is being accessed by the users who are assigned the first security role, and the second binding credential specifies a mapping of permissions of users who are assigned the second security role to access the window or pane and a mapping of permissions of the window or pane to access the data provided by the data service while the window or pane is being accessed by the users who are assigned the second security role; and
assigning the first binding credential and the second binding credential to the window or pane of the application, wherein the application functions as a proxy for access to the data provided by the data service, the application determines, based on the first binding credential, whether the window or pane is granted access to the data provided by the data service at runtime while the window or pane is being accessed by at least the first user who is assigned the first security role, and the application determines, based on the second binding credential, whether the window or pane is granted access to the data provided by the data service at runtime while the window or pane is being accessed by at least the second user who is assigned the second security role;

responsive to detecting the first user requesting access to the window or pane of the application, accessing the first security role assigned to the first user;

based on the first security role assigned to the first user, determining whether the first user is allowed to access the window or pane of the application;

responsive to determining that the first user is allowed to access the window or pane of the application:
  presenting the window or pane of the application to the first user; and
  based on the first binding credential, determining whether the window or pane of the application is granted access to the data provided by the data service at runtime; and responsive to determining that the window or pane of the application is granted access to the data provided by the data service at runtime for the first user, granting, to the window or pane of the application, access to the data provided by the data service as specified by the first binding credential.

7. The system of claim 6, wherein:
the indication of whether the window or pane is allowed to access the data service indicates whether the window or pane has read-only or read/write access to the data service; and
extrapolating permissions for accessing the data service by the at least one window or pane further is based on the indication of whether the window or pane is granted read-only or read/write access to the data service and the first binding credential indicates whether the window or pane has read-only access or read/write access to the data service.

8. The system of claim 7, wherein the access to the data provided by the data service is read-only access or read/write access to the data service.

9. The system of claim 6, wherein:
the application accesses the data service using at least one representational state transfer (REST) call to the data service; and
the application is configured to generate the at least one REST call responsive to the user being successfully validated to access the window or pane.

10. The system of claim 6, the executable operations further comprising:
responsive to detecting the second user requesting access to the window or pane of the application, accessing the second security role assigned to the second user;
based on the second security role assigned to the second user, determining whether the second user is allowed to access the window or pane of the application;
responsive to determining that the second user is allowed to access the window or pane of the application:
  presenting the window or pane of the application to the second user; and
  based on the second binding credential, determining whether the window or pane of the application is granted access to the data provided by the data service at runtime for the second user; and responsive to determining that the window or pane of the application is not granted access to the data provided by the data service at runtime for the second user, denying, to the window or pane of the application, access to the data provided by the data service as specified by the second binding credential.

11. A computer program product comprising a computer readable storage medium having program code stored thereon, wherein the computer readable storage medium is not a transitory, propagating signal per se, the program code executable by a processor to perform a method comprising:
receiving, by the processor, during development of an application, an association between at least one window or pane of the application and at least one data service, wherein the application is provided as a service in a cloud computing environment;
receiving, by the processor, rules applicable to the at least one window or pane of the application, the rules comprising:
  information indicating a first security role assigned to at least a first user who is allowed to access the window or pane of the application and at least a second security role assigned to at least a second user who is allowed to access the window or pane; and
  information indicating whether the window or pane is allowed to access the data service based on the first security role assigned to at least the first user and indicating whether the window or pane is allowed to access the data service based on the second security role assigned to at least the second user;
based on the rules applicable to the at least one window or pane, automatically extrapolating, by a software development tool executed by a processor, permissions for accessing the data service by the at least one window or pane;
based on the permissions extrapolated for accessing the data service by the at least one window or pane, automatically creating, by the software development tool, a first binding credential configured to be processed to determine whether the window or pane of the application is granted access to data provided by the data service at runtime while the window or pane is being accessed by at least the first user assigned the first security role, and automatically creating, by the software development tool, at least a second binding credential configured to be processed to determine whether the window or pane of the application is granted access to the data provided by the data service at runtime while the window or pane is being accessed by at least the second user assigned the second security role, wherein the first binding credential specifies a mapping of permissions of users who are assigned the first security role to access the window or pane and a mapping of permissions of the window or pane to access the data provided by the data service while the window or pane is being accessed by the users who are assigned the first security role, and the second binding credential specifies a mapping of permissions of users who are assigned the second security role to access the window or pane and a mapping of permissions of the window or pane to access the data provided by the data service while the window or pane is being accessed by the users who are assigned the second security role; and
assigning the first binding credential and the second binding credential to the window or pane of the application, wherein the application functions as a proxy for access to the data provided by the data service, the application determines, based on the first binding credential, whether the window or pane is granted access to the data provided by the data service at runtime while the window or pane is being accessed by at least the first user who is assigned the first security role, and the application determines, based on the second binding credential, whether the window or pane is granted access to the data provided by the data service at runtime while the window or pane is being accessed by at least the second user who is assigned the second security role;

responsive to detecting the first user requesting access to the window or pane of the application, accessing the first security role assigned to the first user;

based on the first security role assigned to the first user, determining whether the first user is allowed to access the window or pane of the application;

responsive to determining that the first user is allowed to access the window or pane of the application:
   presenting the window or pane of the application to the first user; and
   based on the first binding credential, determining whether the window or pane of the application is granted access to the data provided by the data service at runtime; and responsive to determining that the window or pane of the application is granted access to the data provided by the data service at runtime for the first user, granting, to the window or pane of the application, access to the data provided by the data service as specified by the first binding credential.

12. The computer program product of claim 11, wherein:
the indication of whether the window or pane is allowed to access the data service indicates whether the window or pane has read-only or read/write access to the data service; and
extrapolating permissions for accessing the data service by the at least one window or pane further is based on the indication of whether the window or pane is granted read-only or read/write access to the data service and the first binding credential indicates whether the window or pane has read-only access or read/write access to the data service.

13. The computer program product of claim 12, wherein the access to the data provided by the data service is read-only access or read/write access to the data service.

14. The computer program product of claim 11, the method further comprising:
responsive to detecting the second user requesting access to the window or pane of the application, accessing the second security role assigned to the second user;

based on the second security role assigned to the second user, determining whether the second user is allowed to access the window or pane of the application;

responsive to determining that the second user is allowed to access the window or pane of the application:
   presenting the window or pane of the application to the second user; and
   based on the second binding credential, determining whether the window or pane of the application is granted access to the data provided by the data service at runtime for the second user; and responsive to determining that the window or pane of the application is not granted access to the data provided by the data service at runtime for the second user, denying, to the window or pane of the application, access to the data provided by the data service as specified by the second binding credential.

\* \* \* \* \*